US011125391B2

(12) United States Patent
Al Khowaiter et al.

(10) Patent No.: US 11,125,391 B2
(45) Date of Patent: Sep. 21, 2021

(54) PROCESS AND METHOD FOR TRANSPORTING LIQUID HYDROCARBON AND $CO_2$ FOR PRODUCING HYDROGEN WITH $CO_2$ CAPTURE

(71) Applicant: Saudi Arabian Oil Company, Dhahran (SA)

(72) Inventors: Ahmad O. Al Khowaiter, Dhahran (SA); Aqil Jamal, Dhahran (SA); Mourad Younes, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 61 days.

(21) Appl. No.: 16/751,905

(22) Filed: Jan. 24, 2020

(65) Prior Publication Data

US 2020/0240588 A1 Jul. 30, 2020

Related U.S. Application Data

(60) Provisional application No. 62/797,031, filed on Jan. 25, 2019.

(51) Int. Cl.
*F17C 7/04* (2006.01)
*B01J 7/00* (2006.01)
(Continued)

(52) U.S. Cl.
CPC ................ *F17C 7/04* (2013.01); *B01J 7/00* (2013.01); *C01B 3/34* (2013.01); *F25J 3/0266* (2013.01);
(Continued)

(58) Field of Classification Search
CPC ........ F25J 1/0022; F25J 1/0027; F25J 1/0274; F25J 1/0035; F25J 1/0278; F25J 1/0223;
(Continued)

(56) References Cited

U.S. PATENT DOCUMENTS 9,834,294 B2 12/2017 Cooper et al.
10,150,535 B2 12/2018 Hellesmark et al.
(Continued)

FOREIGN PATENT DOCUMENTS

EP 2716542 A2 4/2014
GB 2559149 A1 8/2018
(Continued)

OTHER PUBLICATIONS

Written Opinion of the International Preliminary Examining Authority in corresponding PCT Application No. PCT/US2020/014992 dated Jan. 13, 2021. 7 pages.
(Continued)

*Primary Examiner* — Timothy P. Kelly
*Assistant Examiner* — Christopher M Afful
(74) *Attorney, Agent, or Firm* — Leason Ellis LLP

(57) ABSTRACT

Systems and methods related to loading and unloading stations for simultaneous unloading of a first fluid from at least one storage tank in a vessel and loading of a second fluid into a storage tank of the same vessel are provided. In at least one aspect, a loading and unloading station includes a first connector for fluid connection to a storage tank of the vessel for unloading the first fluid, and a source of the second fluid. The station also includes a second connector for fluidly connecting the source of the second fluid with a storage tank of the vessel for loading the second fluid. The station further includes a first thermal linkage between the first fluid being unloaded and the second fluid being loaded that facilitates heat transfer between the first fluid and the second fluid at the loading and unloading station.

15 Claims, 10 Drawing Sheets

(51) Int. Cl.
*C01B 3/34* (2006.01)
*F25J 3/02* (2006.01)

(52) U.S. Cl.
CPC ..... *F25J 3/0295* (2013.01); *C01B 2203/1247* (2013.01); *F17C 2221/013* (2013.01); *F17C 2221/035* (2013.01); *F17C 2227/0355* (2013.01); *F17C 2265/03* (2013.01); *F25J 2210/80* (2013.01); *F25J 2210/90* (2013.01); *F25J 2290/62* (2013.01)

(58) Field of Classification Search
CPC ...... F25J 1/0244; F25J 1/0234; F25J 3/04533; F25J 1/0015; F25J 3/04563; F25J 2235/60; F25J 2230/80; F25J 2260/80; F25J 2260/44; F25J 2240/12; F25J 2290/12; F25J 2230/30; F25J 2235/42; F25J 2290/62; F25J 2230/08; F25J 2210/42; F25J 2210/80; F25J 2230/20; F25J 2235/80; F25J 3/0266; F25J 3/0295; F25J 2210/90; F25J 2220/64; F25J 2210/62; F25J 2230/42; F25J 2270/16; B63B 25/16; F17C 2221/013; F17C 2221/014; F17C 2223/033; F17C 2270/0105; F17C 7/04; F17C 2221/035; F17C 2227/0355; F17C 2265/03; F17C 2221/033; Y02C 20/40; Y02C 10/14; Y02P 90/70; B01J 7/00; C01B 3/34; C01B 2203/1247

See application file for complete search history.

(56) References Cited

U.S. PATENT DOCUMENTS

| | | | |
|---|---|---|---|
| 2007/0006920 A1 | 1/2007 | Borseth et al. | |
| 2008/0256959 A1 | 10/2008 | Aspelund et al. | |
| 2010/0221619 A1* | 9/2010 | Fujihara | H01M 8/04753 429/423 |
| 2010/0251763 A1* | 10/2010 | Audun | F25J 3/04266 62/614 |
| 2014/0027008 A1 | 1/2014 | Liem et al. | |
| 2014/0299039 A1* | 10/2014 | Trollux | B63B 25/14 114/74 R |
| 2014/0360226 A1 | 12/2014 | Yoo et al. | |
| 2019/0016603 A1 | 1/2019 | Younes et al. | |

FOREIGN PATENT DOCUMENTS

| | | | |
|---|---|---|---|
| JP | 2004125039 A1 | 4/2004 | |
| WO | WO-03066423 A1 * | 8/2003 | .............. F25J 3/061 |
| WO | 2017083778 A1 | 5/2017 | |
| WO | WO-2017083778 A1 * | 5/2017 | ............. F25J 1/0223 |

OTHER PUBLICATIONS

International Search Report and Written Opinion in Corresponding Patent Application No. PCT/US2020/014992 dated May 13, 2020. 13 pages.

Skagestad et al., "Ship transport of CO2: Status and Technology Gaps", Tel-Tek report No. 2214090, Sep. 16, 2014.

Xu, Gang, et al. "An Improved CO2 Separation and Purification System Based on Cryogenic Separation and Distillation Theory." Energies, vol. 7, No. 5, 2014, pp. 3484-3502., doi:10.3390/en7053484.

Seo, Youngkyun, et al. "Comparison of $CO_2$ Liquefaction Pressures for Ship-Based Carbon Capture and Storage (CCS) Chain." International Journal of Greenhouse Gas Control, vol. 52, 2016, pp. 1-12., doi:10.1016/j.jggc.2016.06.011.

Engel, Frithjof, and Alfons Kather. "Improvements on the Liquefaction of a Pipeline CO2 Stream for Ship Transport." International Journal of Greenhouse Gas Control, vol. 72, 2018, pp. 214-221., doi:10.1016/j.ijggc.2018.03.010.

Cato—WP9 Final report: Transportation and unloading of CO2 by ship—a comparative assessment. Version. Apr. 9, 2016.

Lee, Seok Goo, et al. "Optimal Design and Operating Condition of Boil-off $CO_2$ Re-Liquefaction Process, Considering Seawater Temperature Variation and Compressor Discharge Temperature Limit." Chemical Engineering Research and Design, vol. 124, 2017, pp. 29-45., doi:10.1016/j.cherd.2017.05.029.

* cited by examiner

PROCESS AND METHOD FOR TRANSPORTING LIQUID HYDROCARBON AND $CO_2$ FOR PRODUCING HYDROGEN WITH $CO_2$ CAPTURE

CROSS REFERENCE TO RELATED PATENT APPLICATION

This application claims priority to and the benefit thereof from U.S. Patent Application No. 62/797,031, filed Jan. 25, 2019 titled "Process and Method for Transporting Liquid Hydrocarbon and CO2 for Producing Hydrogen with CO2 Capture", the entirety of which is hereby incorporated herein by reference.

TECHNICAL FIELD

The present invention relates generally to transport of fluids and more particularly to efficient and effective ways to transport $CO_2$ and hydrocarbons that reduce energy consumption and shipping costs.

BACKGROUND

Transporting carbon dioxide ($CO_2$) or liquid hydrocarbons over long distances can be difficult due to environmental concerns and the required temperature and pressure required to safely transport the fluids. One possible way to transport $CO_2$ or liquid hydrocarbons over long distance is through the usage of semi-pressurized and refrigerated ships or carriers.

Shipping using these carriers, however, can be inefficient. For instance, the $CO_2$ or hydrocarbons are shipped from a first point to a second point, but the ship typically returns to the first point with an empty load, which raises shipping costs. Additionally, the shipping of $CO_2$ and liquid hydrocarbons requires energy to be consumed at high rates.

Accordingly, there is a need for an efficient and effective ways to transport $CO_2$ and hydrocarbons that reduce energy consumption and shipping costs.

SUMMARY

In a first aspect, a loading and unloading station for simultaneous unloading of a first fluid from at least one storage tank in a vessel and loading of a second fluid into a storage tank of the same vessel is provided. The loading and unloading station includes a first connector for fluid connection to the at least one storage tank for unloading the first fluid, and a source of the second fluid. The loading and unloading station also includes a second connector for fluidly connecting the source of the second fluid with the at least one storage tank of the vessel for loading the second fluid into the at least one storage tank. The loading and unloading station further includes a first thermal linkage between the first fluid being unloaded and the second fluid being loaded that facilitates heat transfer between the first fluid and the second fluid at the loading and unloading station.

In another aspect of the loading and unloading station the first fluid can comprise liquefied petroleum gas (LPG) and the second fluid can comprise $CO_2$. In a further aspect, the first thermal linkage can comprise a heat exchanger that transfers coldness of the LPG to the $CO_2$ resulting in cooling of the $CO_2$. In another aspect, the loading and unloading station further comprises: a $CO_2$ capture unit configured to capture $CO_2$ produced from a carbon containing source and a $CO_2$ liquefaction unit that is fluidly connected to $CO_2$ capture unit and the source of the second fluid. The $CO_2$ liquefaction unit is configured to receive the captured $CO_2$ from the $CO_2$ capture unit, and to liquefy the captured $CO_2$ to desired storage conditions and transport conditions. In a further aspect, the $CO_2$ capture unit and the $CO_2$ liquefaction unit can be a single unit.

In another aspect, the loading and unloading station further comprises a hydrogen production unit fluidly connected to the at least one storage tank for unloading the LPG. The hydrogen production unit is configured to receive the LPG from the at least one storage tank for unloading the LPG and utilize the LPG as a feed stream for producing hydrogen. In a further aspect, the $CO_2$ capture unit is operatively connected to the hydrogen production unit, and further configured to capture $CO_2$ from synthetic gas produced in the hydrogen production unit.

In another aspect, the loading and unloading station further comprises an expansion device configured to receive at least a portion of the LPG from the at least one storage tank in the vessel. The expansion device is configured to reduce a pressure of the LPG prior to its delivery to an LPG unloading unit.

In a second aspect, a loading and unloading station for sequentially unloading $CO_2$ from at least one storage tank in a vessel and for loading LPG into a storage tank of the same vessel is provided. The loading and unloading station includes an LPG production unit, an LPG storage unit, where the LPG storage unit is in fluid communication with the LPG production unit. The loading and unloading station also includes a first connector for fluid connection to the LPG storage unit for loading the LPG into the storage tank of the vessel, and a second connector for unloading the $CO_2$ into a $CO_2$ storage unit. The loading and unloading station further includes at least one of: (A) a first thermal linkage that is configured to: transfer coldness from the $CO_2$ to facilitate liquefaction of the LPG through the first thermal linkage that is associated with the LPG production unit and the $CO_2$ storage unit; and (B) a second thermal linkage that is configured to maintain temperature of the LPG storage unit through the second thermal linkage.

In a further aspect, the loading and unloading station further includes a $CO_2$ compression unit that compresses the $CO_2$ above a predetermined pressure, and a supercritical $CO_2$ unit that receives $CO_2$ from the compression unit, whereby a high pressure, cold $CO_2$ stream is put in thermal linkage with at least one of the LPG production unit and the LPG storage unit. In a further aspect, the supercritical $CO_2$ cycle includes an internal heat exchanger, an external heat exchanger, and a $CO_2$ turbine. The internal heat exchanger is configured to heat the high pressure, cold $CO_2$ stream and transfer the high pressure, cold $CO_2$ stream to the external heat exchanger. The external heat exchanger is configured to further heat the high pressure, cold $CO_2$ stream to create a high pressure, high temperature $CO_2$ stream, and configured to transfer the high pressure, high temperature $CO_2$ stream to the $CO_2$ turbine. The $CO_2$ turbine is configured to expand the high pressure, high temperature $CO_2$ stream to generate power. In a further aspect, the loading and unloading station further includes a heat source operatively connected to the external heat exchanger via a heat linkage. The heat source provides the energy for heating the high pressure, cold $CO_2$ stream in the external heat exchanger. In a further aspect, the high pressure, high temperature $CO_2$ stream exiting the external heat exchanger has a temperature in a range of 100°

C. to 800° C. In another aspect, the $CO_2$ compression unit compresses the $CO_2$ to a pressure in the range of 200 to 500 bar.

In a third aspect, a system for simultaneous loading and unloading of $CO_2$ and a liquid hydrocarbon is provided. The system includes a vessel comprising at least one storage tank configured to transfer the CO2 or the liquid hydrocarbon, and configured to load and unload at least one of the liquid hydrocarbon and CO2. The system also includes a first station at which the liquid hydrocarbon is produced. The first station comprises a liquid hydrocarbon loading unit, a first conduit configured to selectively connect the liquid hydrocarbon loading unit, and a CO2 unloading unit. The first station also comprises a second conduit configured to selectively connect the CO2 unloading unit to the vessel, and at least one of: (a) a first thermal linkage configured to transfer coldness from the second conduit to the first conduit to facilitate liquefaction of the liquid hydrocarbon; and (b) second thermal linkage between the first conduit and second conduit configured to cause condensation of the liquid hydrocarbon in the first conduit. The system also includes a second station at which the CO2 is collected. The second station comprises a CO2 loading unit, a third conduit configured to selectively connect the CO2 loading unit to the vessel, a liquid hydrocarbon unloading unit, and a fourth conduit configured to selectively connect the liquid hydrocarbon unloading unit to the vessel. At the first station, the vessel is configured to simultaneously unload CO2 via the CO2 unloading unit and load the liquid hydrocarbon into the at least one storage tank. At the second station, the vessel is configured to simultaneously unload the liquid hydrocarbon via the liquid hydrocarbon unloading unit and load the CO2 into the at least one storage tank.

In another aspect of the system, the second station further includes a $CO_2$ capture unit configured to capture $CO_2$ produced from a carbon containing source, and a $CO_2$ liquefaction unit fluidly connected to $CO_2$ loading unit. The $CO_2$ liquefaction unit is configured to receive the captured $CO_2$ from the $CO_2$ capture unit, and to liquefy the captured $CO_2$ to desired storage conditions and transport conditions. The second station also includes a third thermal linkage between the $CO_2$ liquefaction unit and the fourth conduit, where the third thermal linkage is configured to help $CO_2$ liquefaction.

In another aspect of the system, the first station further comprises a CO2 storage unit fluidly connected to the CO2 unloading unit and configured to receive CO2 from the CO2 unloading unit. In this aspect, the first station also comprises, a CO2 compression unit fluidly connected to the CO2 storage unit and configured to receive CO2 from the CO2 unloading unit, where the CO2 compression unit is configured to compress CO2 above a predetermined pressure. In a further aspect, the system further includes a CO2 supercritical cycle fluidly connected to the CO2 compression unit, where the CO2 supercritical cycle is configured to receive CO2 from the CO2 compression unit and generate power. In a further aspect, the vessel further includes a boil-off compression unit, a non-condensable separation unit, and a boil-off liquefaction unit. The boil-off compression unit is fluidly connected to the at least one storage tank and configured to receive a boil-off stream from the at least one storage tank comprising CO2 and non-condensable gases such as nitrogen, and compress the boil-off stream. The non-condensable (e.g., nitrogen) separation unit is fluidly connected to the boil-off compression unit and configured to receive the compressed boil-off stream, and separate the non-condensable gases from the CO2. The boil-off liquefaction unit is fluidly connected to the non-condensable separation unit and configured to receive the separated CO2, liquefy the CO2, and transfer the liquefied CO2 back to the at least one storage tank.

Additional aspects, features, and advantages of the embodiments of the present application are set forth in the following detailed description with reference to the drawing figures.

BRIEF DESCRIPTION OF THE DRAWING FIGURES

FIG. 1 displays a diagram of an exemplary $CO_2$ and liquid hydrocarbon transport scheme in accordance with one or more embodiments;

FIG. 2 displays a diagram of an exemplary supercritical $CO_2$ cycle for integration within the $CO_2$ and liquid hydrocarbon transport scheme in accordance with one or more embodiments; and FIGS. 3A-3B display a high-level diagram of an embodiment of the $CO_2$ and liquid hydrocarbon transport scheme, including exemplary thermal linkages in the transport scheme in accordance with one or more embodiments;

DETAILED DESCRIPTION OF CERTAIN EMBODIMENTS OF THE INVENTION

The present application describes systems and methods for efficiently transporting liquid hydrocarbons and $CO_2$ and reducing overall energy consumption of the transport scheme. Further, the present systems and methods involve thermal linkage mechanisms between the liquid hydrocarbon facilities and the $CO_2$ facilities that allows for harnessing of the "coldness" of the $CO_2$, during at least one of and preferably both the unloading and loading process and thus additional energy savings is realized.

In one or more embodiments, the present system comprises a liquid hydrocarbon/$CO_2$ transport scheme including a first location ("Point A") having a liquid hydrocarbon loading facility and a $CO_2$ unloading facility, a second location ("Point B") having a $CO_2$ loading facility and a liquid hydrocarbon unloading facility, and a vessel (e.g., marine vehicle, land-based vehicle, such as tanker truck or a tanker railway car) configured to alternatively transfer $CO_2$ and a liquid hydrocarbon feed between the first and second locations. The liquid hydrocarbon feed can be transported via the vessel from Point A to Point B for subsequent hydrogen production at Point B. The same vessel can then transport $CO_2$ that is captured from the hydrogen production at Point B back to Point A. In one or more embodiments, the facilities at both Points A and B can comprise one or more thermal linkages (e.g., heat exchangers, heat pipes) configured to provide heat/cold integration (e.g., heat transfer, cold transfer) between the $CO_2$ facilities and the liquid hydrocarbon facilities. This energy transfer at strategic locations of the transport scheme reduces the overall energy consumption and transport costs for $CO_2$/liquid hydrocarbon storage and transportation.

The referenced systems and methods for transporting liquid hydrocarbons and $CO_2$ are now described more fully with reference to the accompanying drawings, in which one or more illustrated embodiments and/or arrangements of the systems and methods are shown. The systems and methods of the present application are not limited in any way to the illustrated embodiments and/or arrangements as the illustrated embodiments and/or arrangements. It should be understood that the systems and methods as shown in the accompanying figures are merely exemplary of the systems and methods of the present application, which can be embodied in various forms as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods.

Figure 1:
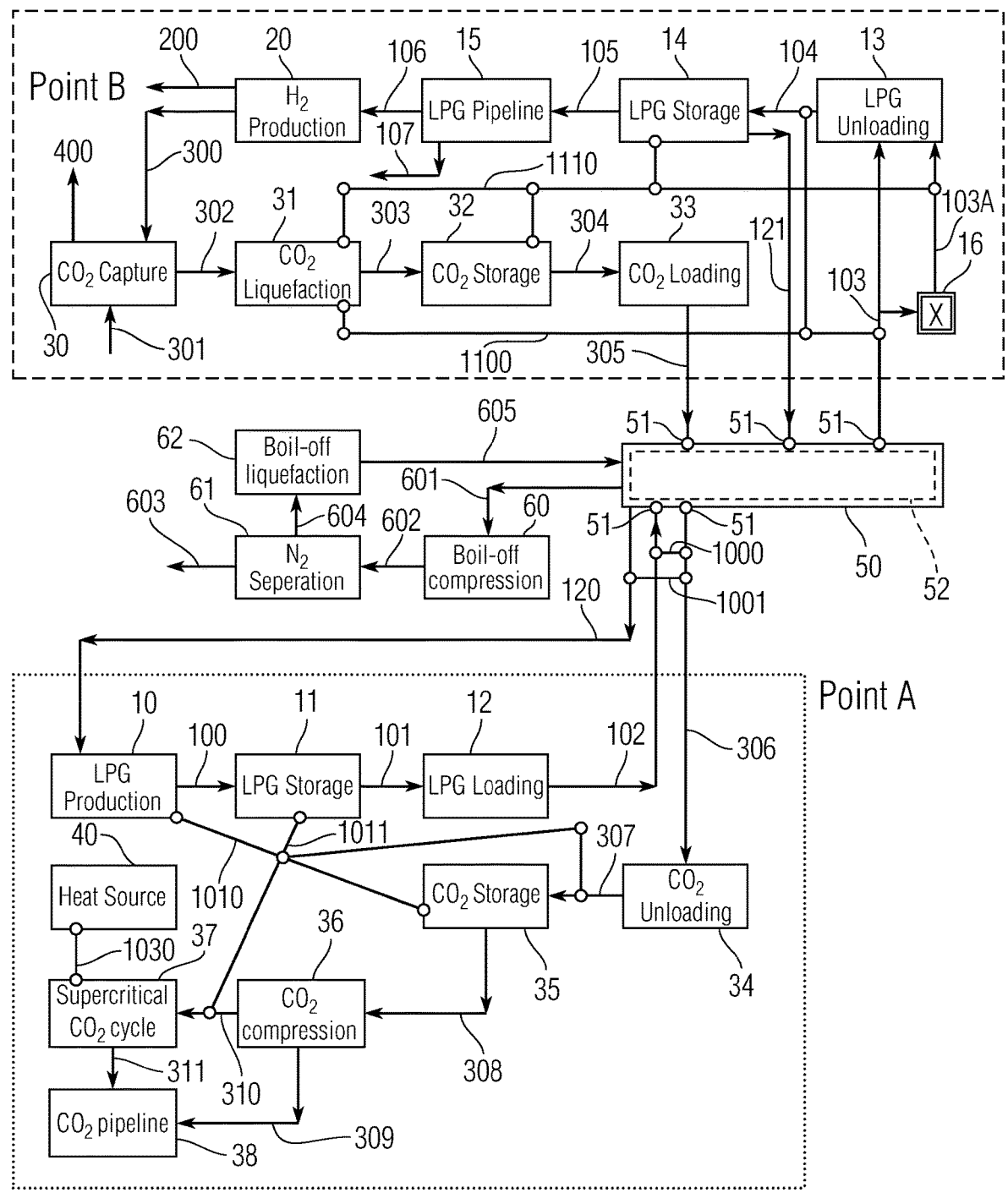

FIG. 1 displays a diagram of an exemplary system for $CO_2$ and liquid hydrocarbon transport, which utilizes heat/cold integration of the $CO_2$ and liquid hydrocarbon facilities in accordance with one or more embodiments. The system comprises a first location, "Point A" (denoted by the dotted line), which includes a $CO_2$ loading facility and a hydrocarbon unloading facility, a second location, "Point B," (denote by the dashed line) having a hydrocarbon loading facility and a $CO_2$ unloading facility, and a vessel 50 configured to alternatively transfer the liquid $CO_2$ and the liquid hydrocarbons between Points A and B. It should be understood that the hydrocarbon and $CO_2$ facilities at Points A and B comprise numerous containers, pipe, pipelines, connectors, gauges, and valves, for controlling the flow, temperature, and pressure of the $CO_2$ and hydrocarbon streams, for example, as would be understood by a person of ordinary skill in the art. For example, there can be one or more docking stations (loading and unloading stations) as Points A and B that contain equipment to allow a fluid connection to be established and flow regulated for either: (1) liquid $CO_2$ downloading and liquid hydrocarbons being uploaded or (2) liquid $CO_2$ uploading and liquid hydrocarbons downloading.

While the vessel 50 is represented in FIG. 1 as a marine vessel (e.g., ship or tanker), in other embodiments the vessel can be a land-based vehicle (e.g., tanker truck or tanker car for a train), or other type of carrier configured for transporting LPG and $CO_2$. Further, while the liquid hydrocarbon represented in the figures and described in the following description is liquefied petroleum gas (LPG), in other embodiments other types of liquid hydrocarbons can be utilized such as liquefied natural gas (LNG). As exemplified in FIG. 1, the vessel 50 can have one or more storage containers (storage tanks) 52 for storing the $CO_2$ and/or the liquid hydrocarbon (e.g., LPG).

As known in the art, a typical LNG marine carrier has four to six storage tanks located along the center-line of the marine vessel. Surrounding these storage tanks is a combination of ballast tanks, cofferdams and voids so as to, in effect, provide the marine vessel a double-hull type design.

Inside each storage tank, there are typically three submerged pumps. There are two main cargo pumps which are used in cargo discharge operations and a much smaller pump which is referred to as the spray pump. The spray pump is used for either pumping out liquid. LNG to be used as fuel (via a vaporizer), or for cooling down cargo tanks. It can also be used for "stripping" out the last of the cargo in discharge operations. All of these pumps are contained within what is known as the pump tower which hangs from the top of the tank and runs the entire depth of the tank. The pump tower also contains the tank gauging system and the tank filling line, all of which are located near the bottom of the tank.

In membrane-type marine vessels, there is also an empty pipe with a spring-loaded foot valve that can be opened by weight or pressure. This structure represents an emergency pump tower. In the event both main cargo pumps fail the top can be removed from this pipe and an emergency cargo pump lowered down to the bottom of the pipe. The top is replaced on the column and then the pump is allowed to push down on the foot valve and open it. The cargo can then be pumped out safely.

All cargo pumps typically discharge into a common pipe which runs along the deck of the vessel; it branches off to either side of the vessel to the cargo manifolds, which are used for loading or discharging. AH cargo tank vapor spaces are linked via a vapor header which runs parallel to the cargo header. This also has connections to the sides of the ship next to the loading and discharging manifolds.

Thus, when the vessel comprises an LNG carrier, the fluid, in this case either LPG or $CO_2$ or other suitable fluid (liquid or gas) passes through cargo manifolds for the loading and unloading of the respective cargo (e.g., in this case and according to one embodiment, LPG or $CO_2$).

With continued reference to FIG. 1, beginning at Point A, an LPG stream can be produced at an LPG production unit 10 via fractionation of and subsequent liquefaction of gas condensates and a petroleum stream. It will be appreciated that any number of conventional techniques can be used to produce the LPG stream. The produced LPG stream can then be transported via line 100 (e.g., conduit, piping) to an LPG storage facility 11 (such as a tank), where the LPG is stored at an appropriate temperature and pressure to maintain the LPG at liquid phase. As used herein in reference to the figures, the numbered "lines" (e.g., line 100) refer to a conduit or piping configured to transfer fluids, including hydrocarbons and/or $CO_2$, between the various production, processing, and storage units of the $CO_2$ and hydrocarbon facilities.

In one or more embodiments, LPG storage facility 11 is maintained at a temperature between approximately $-50°$ C. and ambient temperature and at a pressure between approximately 0.5 bar and 15 bar. However, these values are only exemplary and other storage conditions can be used depending upon the type of storage facility, etc.

When the vessel 50 is ready for loading at Point A, the LPG stream is withdrawn from the LPG storage facility 11 via line 101 and transferred to an LPG loading facility 12. The LPG stream is then transferred from the loading facility 12 via line 102 to the vessel 50. In at least one embodiment, the system can further comprise a gaseous LPG line 120 that transfers back a portion of the LPG from the vessel to the LPG loading unit 12, the LPG storage facility 11, and/or the LPG production unit 10. Line 120 is used to control the pressure in the vessel because in instances in which the system cannot accommodate the overpressure, excess LPG could be flared.

Once the LPG is loaded onto the vessel 50 (e.g., into the cargo tanks through the cargo manifolds), the vessel 50 transports the LPG from Point A (origin) to Point B (destination). The vessel 50 is selectively configured to maintain the LPG at a selected pressure and temperature for LPG transport, and is also configured to maintain a selected pressure and temperature for liquefied $CO_2$ transport, as discussed in further detail below.

Once the vessel 50 carrying the LPG has reached Point B, the LPG is unloaded from the vessel 50 through line 103 to LPG unloading unit 13. After unloading, the LPG stream is then conveyed from unloading unit 13 to the LPG storage facility 14 via line 104. The LPG storage facility 14 can be, for example, a large volume facility to control in-country LPG distribution or could be of smaller capacity, built as a buffer for the LPG unloading before transfer to an industry or network. Similar to the loading process at Point A, in one or more embodiments, the LPG storage facility 14 (unloading LPG storage facility) at Point B includes a gaseous LPG return line 121 that connects back to the vessel 50 to control the pressure in the LPG storage facility 14 and to flare or expel any excess pressure buildup in the system.

In one or more embodiments, the LPG stream can be subsequently conveyed from the storage facility 14 to a nearby LPG pipeline 15 via line 105, or alternatively to another industrial facility. In at least one embodiment, after conveyance to the LPG pipeline 15, the LPG stream can be fed via line 106 to a nearby hydrogen production facility 20, where the hydrogen production facility uses the LPG stream as a feedstock to produce hydrogen. The hydrogen production unit 20 can be based on steam reforming, partial oxidation, auto-thermal reforming or any other technology known to those skilled in the art that can produce hydrogen from hydrocarbon feedstocks. In such units, the hydrogen is separated from the synthetic gas and fed to a hydrogen network or is consumed in a nearby industry (line 200). The hydrogen production unit 20 can also be operatively connected to a $CO_2$ capture unit 30. The $CO_2$ capture unit 30 is configured to capture the $CO_2$ from the synthetic gas of the hydrogen production unit 20 (via line 300) that is usually conveyed at high pressure. In at least one embodiment, a second $CO_2$ capture unit can be present that captures $CO_2$ from a furnace flue gas (i.e., a low-pressure $CO_2$ stream) in an embodiment in which the hydrogen production unit 20 utilizes a steam LPG reforming process to make hydrogen. In at least one embodiment, these two $CO_2$ capture units can be combined in one single unit treating the high-pressure and the low-pressure $CO_2$ streams.

In at least one embodiment, the $CO_2$ from the hydrogen production unit 20 can be captured from a high-pressure reformer and the $CO_2$ capture rate can be adapted to match the maximum $CO_2$ capacity that can be transported in the LPG/$CO_2$ vessel back to Point A. In an embodiment in which $CO_2$ is needed in a local or nearby industry, the $CO_2$ capture unit can be designed and operated to capture the $CO_2$ such that a portion is transported in the vessel, and another portion is saved for use in the nearby industry (line 400).

In one or more embodiments, the $CO_2$ capture unit 30 can be utilized to capture $CO_2$ produced from carbon containing source. For example, as shown in FIG. 1, in one or more embodiments the CO2 capture unit 30 can be utilized to capture CO2 produced from the hydrogen production unit 20 and/or a nearby pipeline (line 301). In other embodiments, the CO2 captured by the capture unit 30 can be produced from the reforming of hydrocarbons such as LPG, or from the combustion of fossil fuels or biomass. In at least one embodiment, the CO2 capture unit 30 can capture CO2 directly from the air. In the exemplary embodiment of FIG. 1, the CO2 is produced from the hydrogen production unit that is fed with hydrocarbons (LPG or natural gas), in addition to cases where the CO2 can be captured far from the port from various sources and then transferred to the port via pipeline.

With continued reference to FIG. 1, $CO_2$ captured by $CO_2$ capture unit 30 can then be transferred via line 302 to a $CO_2$ liquefaction unit 31 where the $CO_2$ is conditioned and liquefied to desired storage conditions and/or $CO_2$ transport conditions. In one or more embodiments, the liquefied $CO_2$ is then fed to a $CO_2$ storage facility 32 via line 303 to gather the necessary volume for loading and transport in the vessel 50.

Figure 5:
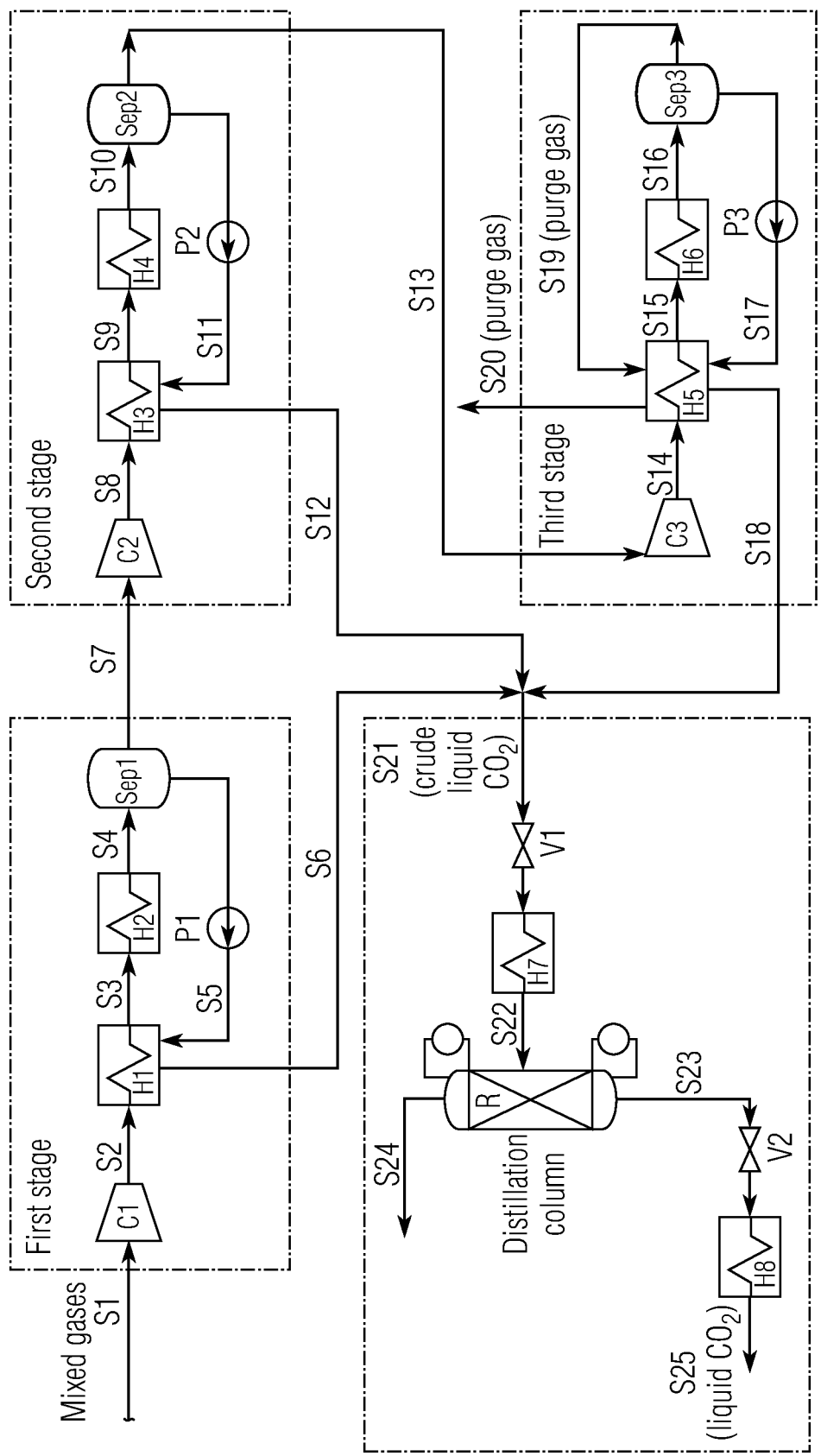
FIG. 5 shows a conventional configuration for $CO_2$ capture and liquefaction in accordance with one or more embodiments.

In at least one embodiment, the $CO_2$ capture unit 30 and the $CO_2$ liquefaction unit 31 can be a single unit, such as a $CO_2$ purification unit based on cold or cryogenic separation or distillation. Many configurations for $CO_2$ capture and liquefaction are known in the art for capturing $CO_2$ by separation or liquefaction as exemplified in FIG. 5 and as shown and described in Gang Xu et al., Energies 2014, 7, 3484-3502, doi:10.3390/en7053484, which is hereby incorporated by reference. In such an instance, the thermal linkage 1110 as shown in FIG. 1 can be operatively connected between the combined capture and liquefaction unit and the cold LPG stream at line 103A and/or the LPG storage unit 14. For instance, in an embodiment in which the $CO_2$ liquefaction unit 31 is integrated with the $CO_2$ capture unit 30 as shown in FIG. 5, the thermal linkage 1100 and/or 1110 (as shown in FIG. 1) can be provided between the LPG and one or many of the internal heat exchangers or external heat exchangers H1, H2, H3, H4, H5 and H6, and/or the streams in-between them as shown in FIG. 5. LPG coldness configuration can be thermally linked to any or multiple streams or heat exchangers in the $CO_2$ liquefaction unit that are at a temperature higher than the LPG stream temperature, which is generally between −50° C. and ambient temperature.

In one or more embodiments, the thermal linkages 1100 and 1110 can be any mechanism known in the art for establishing thermal communication between the $CO_2$ liquefaction unit 31 and the LPG stream at line 103/103A and/or the LPG storage unit 14. For example, the thermal linkages 1100 and/or 1110 can comprise a heat exchanger or a thermal transfer loop that transfers the coldness of the LPG stream to the $CO_2$ liquefaction unit 31 such that it can contribute to the reduction of the temperature of the $CO_2$ stream and its liquefaction energy and thus functioning as a cold sink. Due to the low temperature of LPG stream, line 103/103A and/or the LPG storage unit 14 can act as cold sink for the $CO_2$ liquefaction unit 31. The thermal transfer loop can contain transfer fluid having a low freezing point, for example, and the transfer fluid can be circulated within the thermal transfer loop using a pump or other practical means. Thermal transfer of the coldness from the LPG (line 103/103A and or the LPG storage unit 14) to the $CO_2$ liquefaction unit 31 via the thermal transfer loop (thermal linkages 1100 and 1110) can be accomplished in various ways known in the art, including via heat exchanger fins or coils, heat pipes, along with a suitable heat exchanger fluid for example high normal boiling point temperature hydrocarbons such as pentane, hexane, or water ethylene glycol mixtures.

Figure 7:
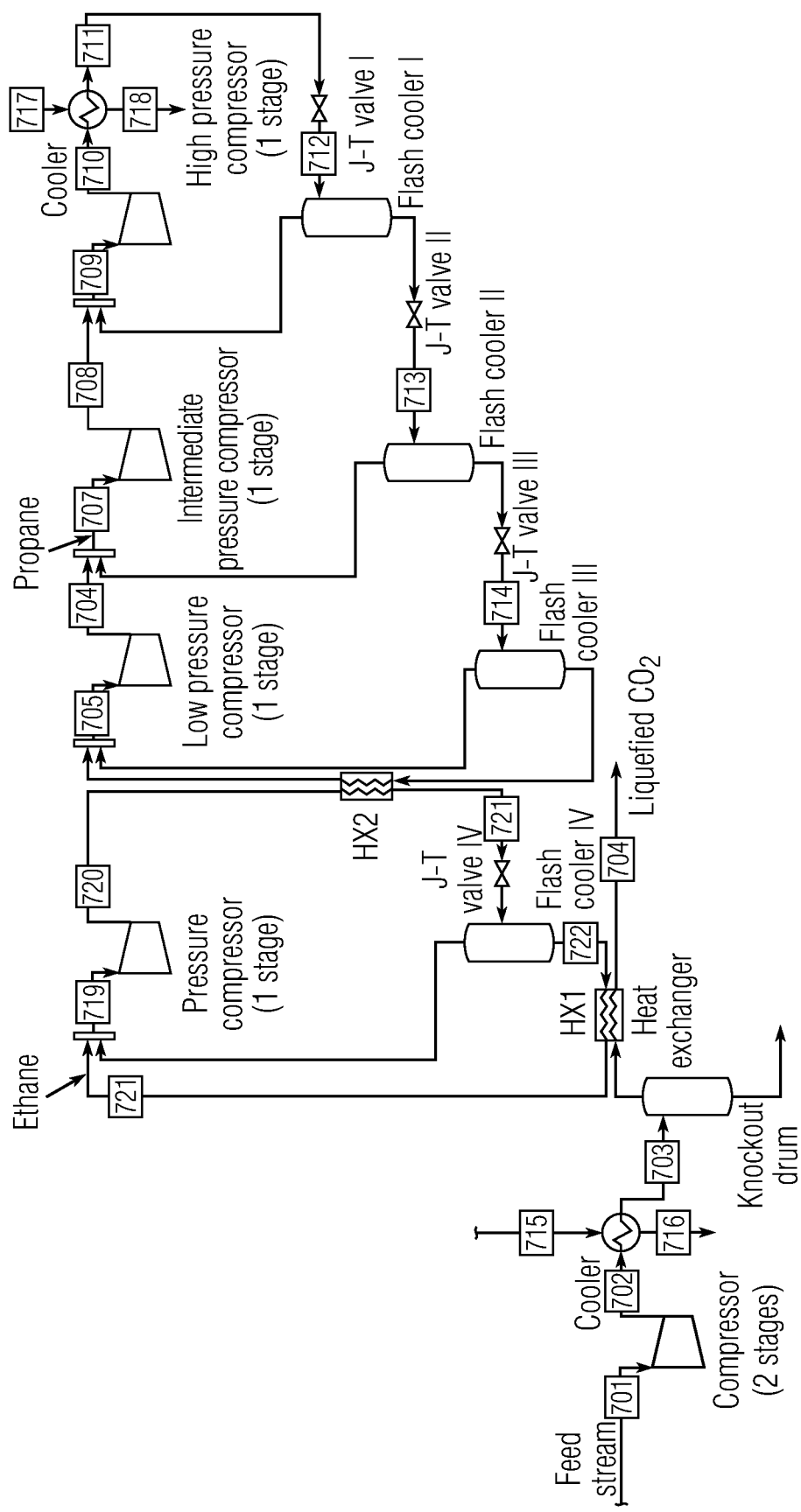
FIG. 7 shows a conventional closed loop system for a $CO_2$ liquefaction unit in accordance with one or more embodiments.
Figure 8:
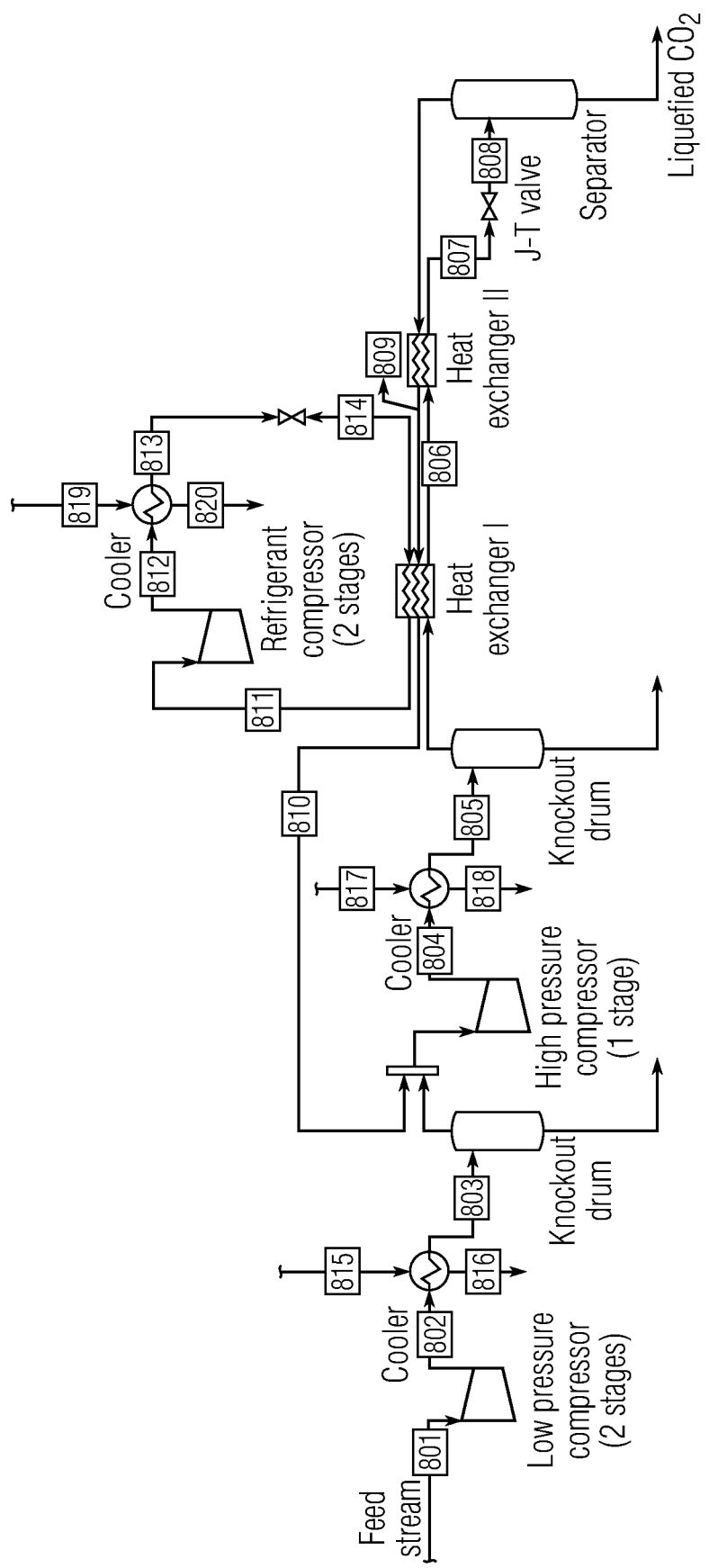
FIG. 8 shows a conventional open loop system for a $CO_2$ liquefaction unit in accordance with one or more embodiments.

In one or more embodiments, the $CO_2$ liquefaction unit 31 can be independent of the $CO_2$ capture unit 30, as shown in FIG. 1. In such an embodiment, the $CO_2$ liquefaction unit can be based on an external refrigeration system or a closed loop system such as the system presented in FIG. 7 and shown and described in Youngkyun Seo et al., Comparison of $CO_2$ Liquefaction Pressures for Ship-Based Carbon Capture and Storage (CCS) Chain, International Journal of Greenhouse Gas Control, 52 (2016), 1-12, which is hereby incorporated by reference. Alternatively, the $CO_2$ liquefaction unit can be based on an open loop system such as the Linde Hampson system (pictured in FIG. 8 and shown and described in Youngkyun Seo et al., which is hereby incorporated by reference) and or another similar system. In the case of closed loop systems such as the example shown in FIG. 7, the thermal linkage 1100 and/or 1110 (as shown in FIG. 1) can be provided between the LPG and one or many of heat exchangers HX1, HX2, Flash cooler I, Flash cooler II, and/or the streams in-between them, and or line 711 as shown in FIG. 7. In the case of an open system such as in FIG. 8, thermal linkage 1100 and/or 1110 (as shown in FIG. 1) can be provided between the LPG and one or many of heat exchangers: Heat exchanger I, Heat exchanger II, and/or the streams in-between them and/or line 813 as shown in FIG. 8.

Figure 9:
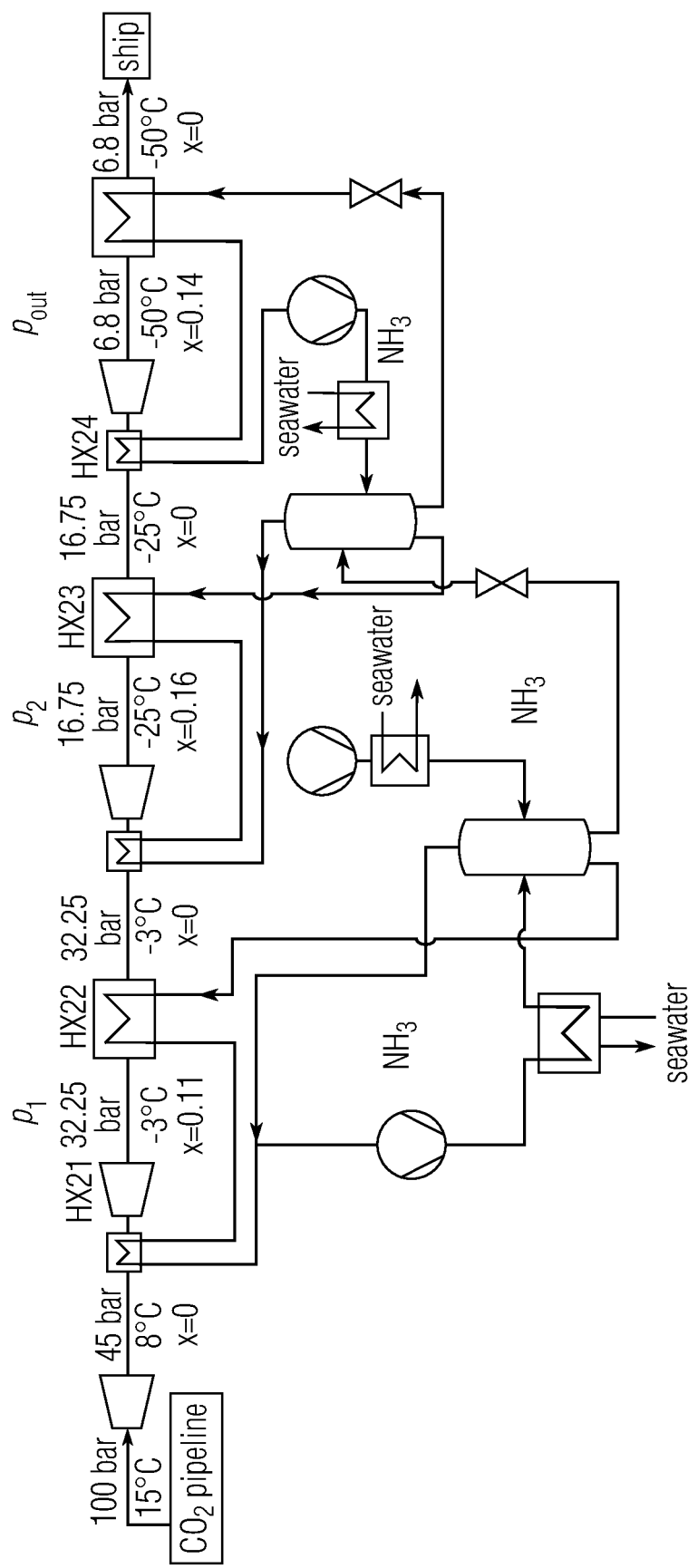
FIG. 9 shows an optimized process configuration for pipeline $CO_2$ liquefaction in accordance with one or more embodiments.

Referring again the FIG. 1, in at least one embodiment, $CO_2$ can be conveyed to the $CO_2$ loading facility 33 through a pipeline and can be pre-conditioned. In such an embodiment, a $CO_2$ liquefaction process at unit 31 is still needed, however its configuration could be different from the various liquefaction units presented above. For example, FIG. 9 shows an optimized process configuration for pipeline $CO_2$ liquefaction as shown and described in Frithjof Engel, Improvements on the Liquefaction of a Pipeline $CO_2$ Stream for Ship Transport, International Journal of Greenhouse Gas Control 72 (2018) 214-221, which is hereby incorporated by reference. In such a configuration, thermal linkage 1100 and/or 1110 of the present system (as shown in FIG. 1) can be provided between the LPG (line 103/103A and or the LPG storage unit 14) and one or many of heat exchangers HX21, HX22, HX23, HX24, and or the streams in-between them as shown in FIG. 9.

Referring again to FIG. 1, when the vessel 50 is ready to be loaded with $CO_2$, the $CO_2$ loading facility 33 withdraws the $CO_2$ from the $CO_2$ storage facility 32 via line 304 and transfers it to the vessel 50 via line 305. In at least one embodiment, a gaseous $CO_2$ return line to the $CO_2$ liquefaction unit 31 and/or $CO_2$ storage facility 32 can be utilized to control the pressure in the vessel 50 during loading of the $CO_2$. If transported over long distances, the $CO_2$ can be transported through pipelines in supercritical state. In such case, the supercritical $CO_2$ would be liquefied before transferred to the vessel 50.

In one or more embodiments, the vessel 50 can be configured to allow for simultaneous loading of $CO_2$ and unloading of LPG, and conversely, simultaneous loading of LPG and unloading of $CO_2$. In such in an embodiment, at Point B the vessel 50 is configured to unload LPG through line 103 and simultaneously load the $CO_2$ through line 305. In at least one embodiment in which there is simultaneous loading and unloading, the LPG unloading line 103 and/or line 104 can be in thermal linkage 1100 with the $CO_2$ liquefaction unit 31 such that the coldness of the LPG stream can contribute to the reduction of the temperature of the $CO_2$ stream and its liquefaction. As expressed herein, "thermal linkage" refers to one or more heat exchangers; heat transfer through a heat pipe or through an intermediate fluid loop; heat transfer through an intermediate solid material that is heated by the hotter stream and cooled by the colder stream; or other means known to a person skilled in the art that allow for the heat transfer (or cold transfer) between two streams.

In at least one embodiment, during the unloading of LPG at Point B, all or a portion of LPG unloading line 103 can be fed to an expansion device 16 before transfer to the LPG unloading unit 13 via line 103A. The feeding of at least a portion of the unloaded LPG to the expansion device 16 reduces the pressure of the LPG as well its temperature. In one or more embodiments, line 103A is in thermal linkage (e.g., via thermal linkage 1110) with one or more of the following: the $CO_2$ liquefaction unit 31, the $CO_2$ loading stream 305, the $CO_2$ vapor stream connecting the vessel 50 to the $CO_2$ storage facility 32 or $CO_2$ liquefaction unit 31, and/or the LPG storage unit 14. In one or more embodiments, the thermal linkage 1110 between line 103 and one or more of the above lines or units can allow the low temperature, low pressure LPG stream in line 103A to maintain its temperature. In such an embodiment, the higher temperature LPG stream (line 103) can be compressed and re-liquefied before it is fed to storage.

Once $CO_2$ loading is completed, the vessel 50 can transport the $CO_2$ from Point B to Point A. Alternatively, the vessel 50 can transport all or a portion of the $CO_2$ to another land-based, on-shore or off-shore unloading point. In at least one embodiment, the $CO_2$ can be transported as a slurry which is a mix of solid $CO_2$ in suspension in liquid $CO_2$ to maximize the $CO_2$ intake and avail latent heat to curb the heat losses and boil-off of the $CO_2$ during transport.

Figure 4:
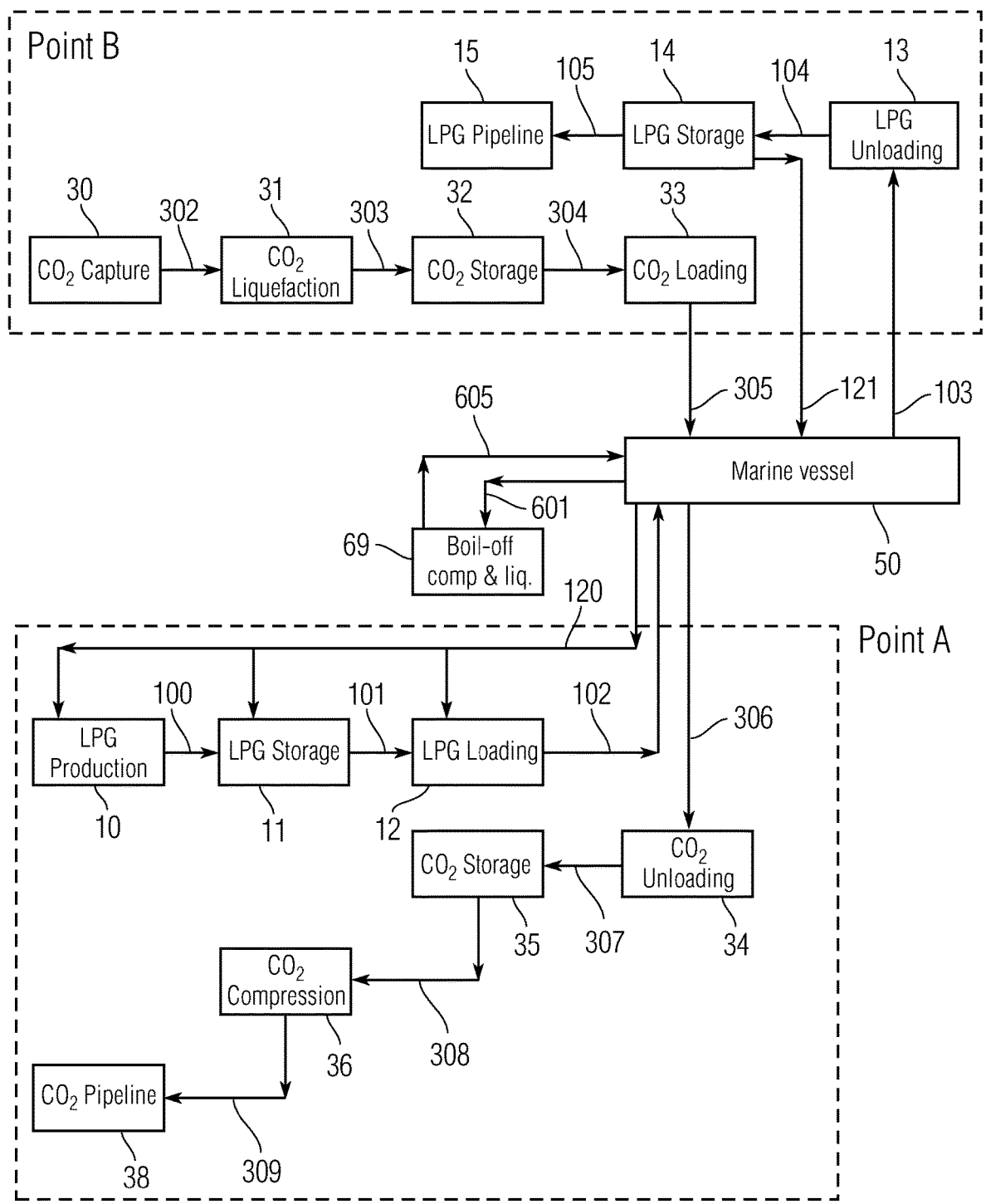
FIG. 4 shows a conventional LPG/$CO_2$ transport scheme having a vessel with a boil-off compression and liquefaction unit in accordance with one or more embodiments.

In one or more embodiments, the vessel 50 can have a dedicated compression and liquefaction unit to condense the LPG boil-off during transport and another compression and liquefaction unit for the $CO_2$ boil-off liquefaction. Alternatively, the vessel 50 can use the same boil-off liquefaction unit for both $CO_2$ and LPG. FIG. 4 shows a typical LPG/$CO_2$ transport scheme having a vessel with a boil-off compression and liquefaction unit 69 in accordance with one or more embodiments.

Figure 6:
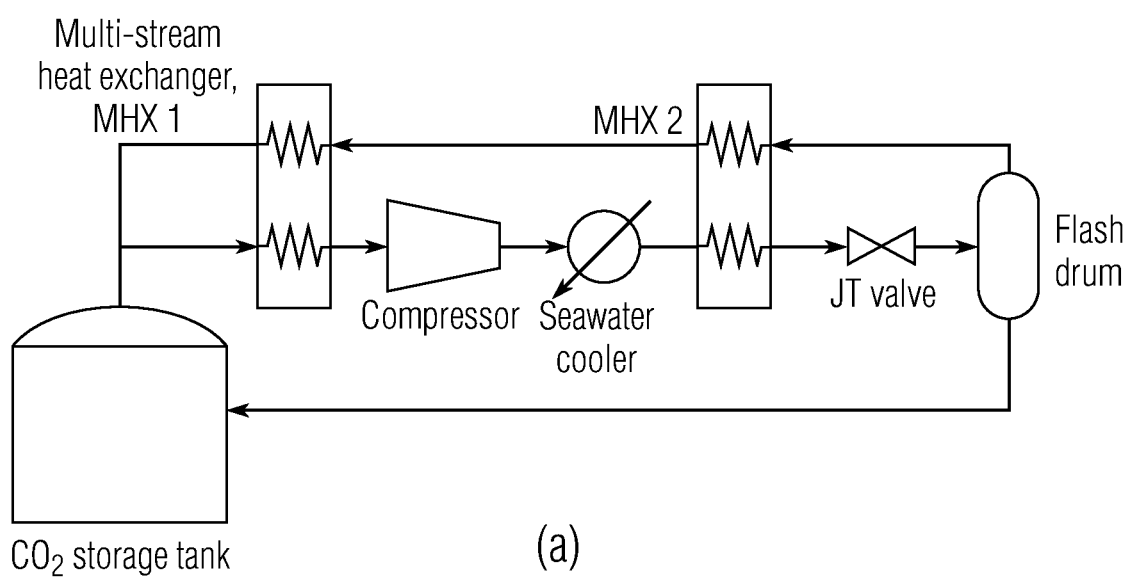
FIG. 6 shows a conventional boil-off re-liquefaction unit for in accordance with one or more embodiments.

A typical boil-off re-liquefaction unit for $CO_2$ is shown at FIG. 6 and is shown and described in Seok Goo Lee et. al., Chemical Engineering Research and Design 124 (2017) 29-45, which is hereby incorporated by reference. In certain configurations, there is no separation of the incondensable compounds from the $CO_2$. However, as shown in FIG. 1, in one or more embodiments, incondensable compounds can be separated from the $CO_2$ stream during transport on vessel 50.

As exemplified in FIG. 1, in one or more embodiments, the system of the present application discloses a boil-off liquefaction unit comprising a nitrogen separation unit or non-condensable separation unit 61, which reduces the non-condensable gases content in the liquid $CO_2$ and reduce the energy spent for the boil-off re-liquefaction. As shown in FIG. 1, the non-condensable separation unit 61 is shown as a nitrogen ($N_2$) separation unit. However, it should be understood that in one or more embodiments, non-condensable gases other than nitrogen can also be separated from the CO2 in separation unit 61, including but not limited O2, CO or methane. In one or more embodiments, when the vessel is transporting CO2, a boil-off stream 601 in the vessel is compressed in a boil-off compression unit 60 and fed through line 602 to a non-condensable separation unit 61 where nitrogen and other incondensable compounds are separated from the $CO_2$ stream. The separated nitrogen ($N_2$) and incondensable compounds are removed from the separation unit 61 via line 603. The separated $CO_2$ stream is then transferred to the boil-off liquefaction unit 62 where it is liquefied before being fed back to storage container 52 of the vessel 50 through line 605. Accordingly, using the boil-off liquefaction and compression units and the non-condensable separation unit, the present system can purify the $CO_2$ while it is being transported on the vessel 50.

Separation unit 61 can be based on membrane technology, adsorption technology or any other technology known in the art that can separate nitrogen and incondensable compounds from the $CO_2$ stream. Preferred embodiments for separation unit 61 comprise membrane technology and/or cryogenic separation. In this latter case, unit 61 can be a cryogenic unit that simultaneously liquefies the $CO_2$ and reject the incondensable compounds, such as the separation unit (presented in FIG. 5) and shown and described in Gang Xu et al., Energies 2014, 7, 3484-3502, doi:10.3390/en7053484, which is hereby incorporated by reference.

In an embodiment in which the $CO_2$ is transported from Point B to Point A, upon reaching Point A the $CO_2$ is transferred out of the vessel via line 306 to $CO_2$ unloading unit 34, which then conveys the $CO_2$ into an intermediate $CO_2$ storage facility 35 via line 307. After temporary storage at facility 35, the $CO_2$ can be conveyed through line 308 to a $CO_2$ compression station (unit) 36, where the $CO_2$ stream is compressed to a predetermined $CO_2$ utilization pressure or $CO_2$ pipeline pressure. In one or more embodiments, at least a portion of the compressed $CO_2$ can then be transported out of station 36 through line 309 and into a $CO_2$ pipeline 38.

In one or more embodiments, point A can also comprises a supercritical $CO_2$ cycle 37 that is operatively connected to the $CO_2$ compression station 36 and/or the $CO_2$ pipeline 38. At least a portion of the compressed $CO_2$ from station 36 can be fed to the supercritical $CO_2$ cycle 37 via line 310.

In one or more embodiments, $CO_2$ withdrawn from the $CO_2$ storage facility 35 (generally operated between approximately −50° C. and ambient temperature) is compressed in the $CO_2$ compression station 36 to a $CO_2$ pipeline pressure. The $CO_2$ pipeline pressure can be in the range of approximately 10 bar to approximately 200 bar, and in at least one embodiment, above 200 bar. In certain embodiments, at least a portion of the $CO_2$ can then be conveyed to utilization plants, sequestered underground in aquifers or geological formations, or used for enhanced oil recovery or reservoir pressurization.

In at least one of the embodiment, the $CO_2$ compression unit 36 compresses the $CO_2$ to a pressure above the $CO_2$ pipeline pressure (typically 200 to 500 bar) and provides at least a portion of the $CO_2$ to a supercritical $CO_2$ unit 37 via line 310 where the $CO_2$ is used as a motive fluid to produce power. An exemplary a supercritical $CO_2$ unit (e.g., supercritical $CO_2$ bottoming cycle) in accordance with one or more embodiments is provided in FIG. 2.

Figure 2:
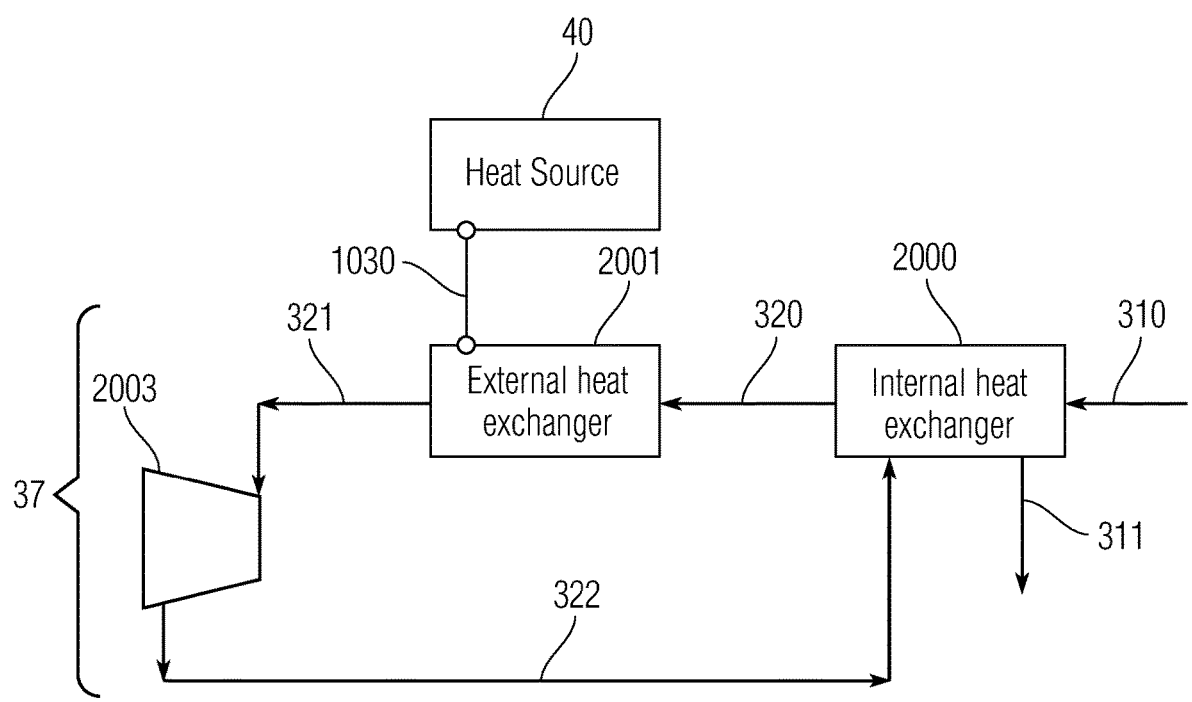

With reference to FIG. 2, in the supercritical $CO_2$ unit 37, a high pressure cold $CO_2$ stream is put in thermal linkage with LPG facilities (thermal linkages 1010 and 1011 as shown in FIG. 1) before being further heated in internal heat exchanger 2000. The $CO_2$ stream can then be transferred via line 320 to an external heat exchanger 2001 in heat linkage 1030 with a heat source 40. Heat source 40 can be waste heat available in adjacent plants or heat from the utility area of the LPG production facility or any heat available from a nearby industry, for example. This heat linkage 1030 can allow the temperature of the $CO_2$ stream exiting the external heat exchanger 2001 at line 321 to reach approximately 100° C. to 800° C. This high-pressure, high-temperature $CO_2$ stream (in line 321) can then be conveyed to $CO_2$ turbine 2003 where it is expanded to generate mechanical work and eventually electricity. In one or more embodiments, the $CO_2$ stream exiting the $CO_2$ turbine 2003 via line 322 has a pressure that is just above the $CO_2$ pipeline pressure and has a temperature between approximately 80° C. and approximately 700° C. The $CO_2$ stream in line 322 can then be fed back to the internal heat exchanger 2000 where it is cooled, while heating the incoming high-pressure $CO_2$ stream from line 310, and then exits heat exchanger 2000 through line 311 to feed the $CO_2$ pipeline 38.

In certain embodiments, other configurations for supercritical $CO_2$ cycle 37 can be used as are known in the art, including configurations in which there are multiple stages of compression. The system of the present application as described also allows for the heat linkage with the heat source 40 and thermal linkages with the LPG facilities with any of these other supercritical $CO_2$ cycle configurations that are known to those skilled in the art. In at least one embodiment, the $CO_2$ compression station 36 can be a multistage compression system in which a portion of the $CO_2$ is compressed to the $CO_2$ pipeline pressure and conveyed to the $CO_2$ pipeline 38 through line 309 while a remaining portion of the $CO_2$ stream is compressed to a higher pressure and fed to the supercritical $CO_2$ cycle 37 through line 310.

In an embodiment in which the vessel 50 is configured to allow simultaneous loading of LPG and unloading of $CO_2$ at Point A, a thermal linkage 1000 can exist between the $CO_2$ unloading line 306 and the LPG loading line 102 or LPG line 101. The thermal linkage 1000 allows for heat transfer between the LPG stream (typically maintained at temperature between ambient and approximately −40° C.) and the $CO_2$ stream (typically maintained between the $CO_2$ triple point temperature [approximately −56° C.] and +10° C.). This heat transfer allows the LPG stream to be further cooled and stored in the vessel 50 at lower temperature as compared with the LPG storage facility 11. Further, in at least one embodiment, the additional coldness of the LPG stream can be used for maintaining the temperature of the LPG stream at the LPG unloading location (Point B) and/or for additional energy transfer. In at least one embodiment, $CO_2$ unloading line 306 can be in thermal linkage with gaseous LPG line 120 (thermal linkage 1001), which allows for the condensation of the gaseous LPG, reducing the load on the LPG production unit 10 and/or the LPG storage facility 11.

As with the thermal linkages 1100 and 1110 at Point B, the thermal linkages 1000 and 1001 can comprise one or more heat exchangers or thermal transfer loops that can contain transfer fluid having a low freezing point, for example. The transfer fluid can be circulated within the thermal transfer loop using a pump or other practical means. Thermal transfer between the LPG lines (lines 102 and 120) and the $CO_2$ line 306 via the thermal transfer loop(s) (thermal linkages 1000 and 1001) can be accomplished in various ways known in the art, including via heat exchanger fins or coils, heat pipes, along with a suitable heat exchanger fluid for example high normal boiling point temperature hydrocarbons such as pentane, hexane, or water ethylene glycol mixtures.

In at least one embodiment, two vessels 50 can be used for simultaneously loading/unloading of the liquid hydrocarbon (e.g., LPG) and the CO2, and the vessels can be linked together via one or more thermal linkages. For example, a first vessel can arrive and start unloading the LPG at point B, and a second vessel can arrive few hours or a day later (depending on the amount of fluid to unload) to unload its LPG cargo as well. As the second vessel is unloading the LPG, the storage tanks of the first vessel can undergo purging and conditioning for receiving CO2. As such, via a thermal linkage between the second vessel and the first vessel, the coldness of the LPG being offloaded from second vessel can be used to cool the CO2 stream being loaded on to the first vessel or to provide coldness to the CO2 liquefaction unit that is connected to first vessel.

In an embodiment in which the vessel 50 is not configured for simultaneous loading/unloading, the coldness of the $CO_2$ stream can contribute to the liquefaction of the LPG at LPG production unit 10 via thermal linkage 1010 and/or maintain the temperature of the LPG at the LPG storage facility 11 through thermal linkage 1011. Thermal linkages 1010 and 1011 can connect the LPG production unit 10 and/or the LPG storage facility 11 with one or more of line 307, line 309, line 310 and/or $CO_2$ storage facility 35. While FIG. 1 shows thermal heat linkage 1011 as being operatively connected to LPG storage unit 11, in at least one embodiment, thermal linkage 1011 can be operatively connected to the LPG production unit 10 and/or LPG line 100. As with the thermal linkages 1100 and 1110 at Point B, the thermal linkages 1010 and 1011 can comprise one or more heat exchangers or thermal transfer loops that can contain transfer fluid having a low freezing point, for example. The transfer fluid can be circulated within the thermal transfer loop using a pump or other practical means. Thermal transfer between the LPG facilities (LPG production unit 10, LPG production unit 11) and the $CO_2$ facilities (supercritical $CO_2$ cycle 37, $CO_2$ storage 35) liquefaction unit 31 via the thermal transfer loop (thermal linkages 1100 and 1110) can be accomplished in various ways known in the art, including via heat exchanger fins or coils along with a suitable heat exchanger fluid, for example high normal boiling point temperature hydrocarbons such as pentane, hexane, or water ethylene glycol mixtures. It should also be understood that other thermal linkages of the systems of the present application can be arranged in a similar fashion or by other practical means as would be understood by those skilled in the art.

As discussed above, once the vessel has loaded the LPG load at Point A (and $CO_2$ has been unloaded), it can transport it from Point A to Point B. Alternatively, the vessel can transport all or a portion of the LPG load to another land-based, on-shore, or off-shore unloading point. The vessel 50 is configured to meet and maintain the pressure and temperature requirements for LPG during transport as well as for liquefied $CO_2$ during transport. For instance, the vessel can be configured to transport $CO_2$ between its triple point temperature (approximately −56° C.) and +10° C., and at pressures between approximately 5 bar and approximately 50 bar. In at least one embodiment, the vessel is configured to transport the $CO_2$ close to its triple point conditions, somewhere between the triple point temperature and −40° C. and at a pressure between 5 and 15 bar. The vessel can have a dedicated refrigeration and liquefaction unit to condense the LPG boil-off along the way or can use the same boil-off liquefaction unit for CO2 and LPG.

As discussed above, the vessel 50 can have one or more storage containers (storage tanks) 52 for storing the CO2 and/or the liquid hydrocarbon (e.g., LPG). In one or more embodiments, the vessel 50 can have at least one dedicated storage container for the LPG (or other liquefied hydrocarbon stream) and at least one dedicated storage container for $CO_2$. In one or more embodiments, the storage containers for LPG and $CO_2$ can be semi-pressurized and refrigerated. In at least one embodiment, a common storage container can be used to transport the LPG (or other liquefied hydrocarbon stream) and the CO2 in the respective directions of the transport scheme. In embodiments in which a common storage container is used, conditioning on the storage tank (e.g., depressurization, purging of the previously fluid, CO2 or LPG) must be performed when switching from one fluid to another.

It should be understood that at the various loading and unloading facilities, such as at Points A and B as shown in FIG. 1, the vessel 50 is configured to selectively connect to the various loading and unloading facilities using one or more detachable connectors 51 (e.g., selectively connectable pipes or tubing) configured to provide a fluid connection for transferring or receiving the liquefied hydrocarbon and/or $CO_2$ streams to and from the vessel. In one or more embodiments, each connector 51 can comprise two parts. A first part of the connector 51 selectively attached to the pipe/tubing of the loading and unloading facilities. Likewise, a second part of the connector 51 can be selectively attached to the pipe/tubing of the storage tank of the vessel. The first part and the second part of the connector 51 can be mate together the form a sealed connection between the pipe/tubing of the storage tank of the vessel and the pipe/tubing of the loading or unloading facilities.

It should also be understood that while the above description generally refers to the vessel transporting LPG and $CO_2$ between "Point A" and "Point B," in certain embodiments the vessel 50 can transport the liquid hydrocarbon stream and/or the $CO_2$ to locations other than Point A and Point B, such as other land-based, on-shore, or off-shore locations. Transportation to the other locations can be in lieu of transportation to Point A and/or Point B or in addition to transportation to Point A and/or Point B.

Figure 3A:
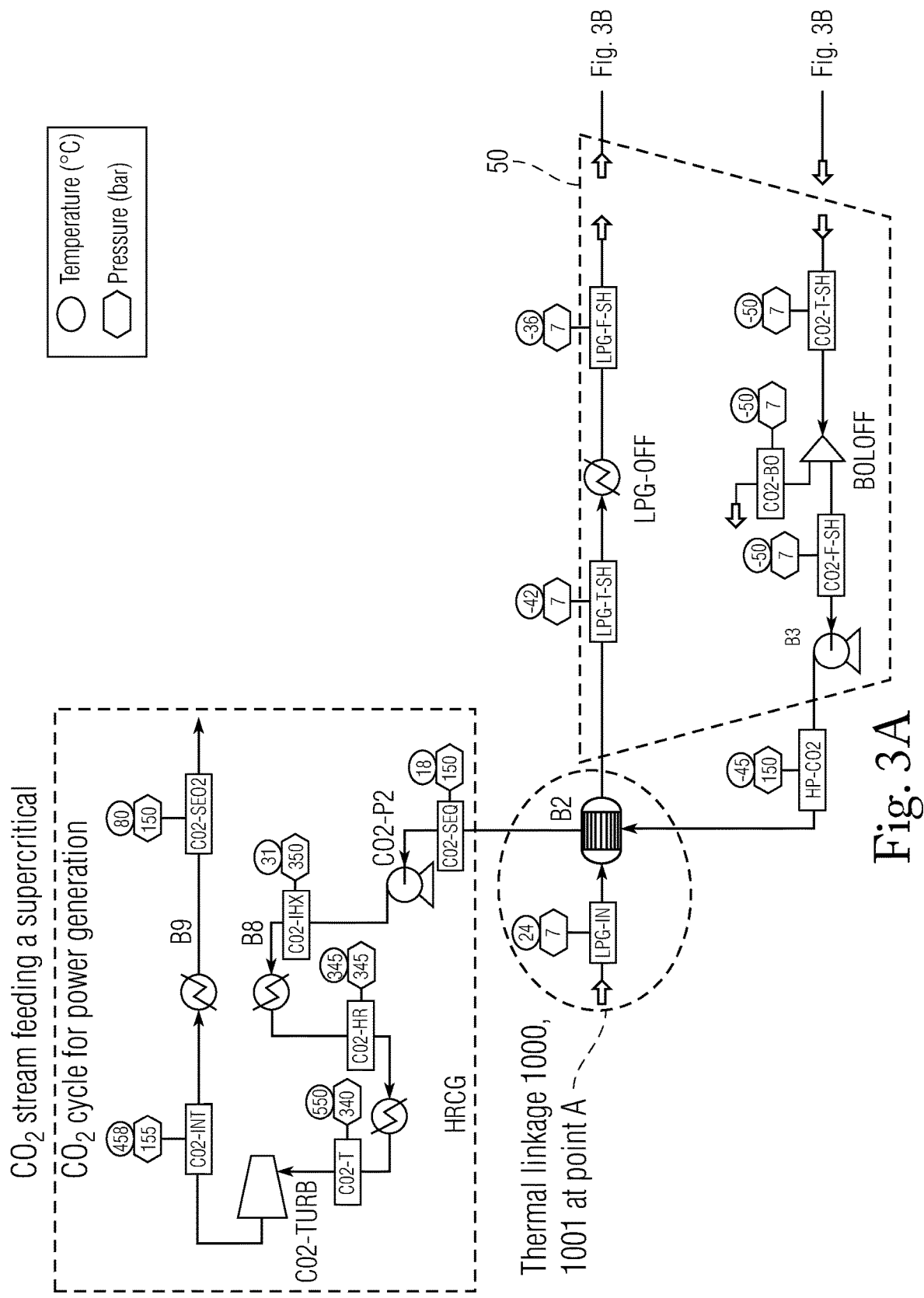
Figure 3B:
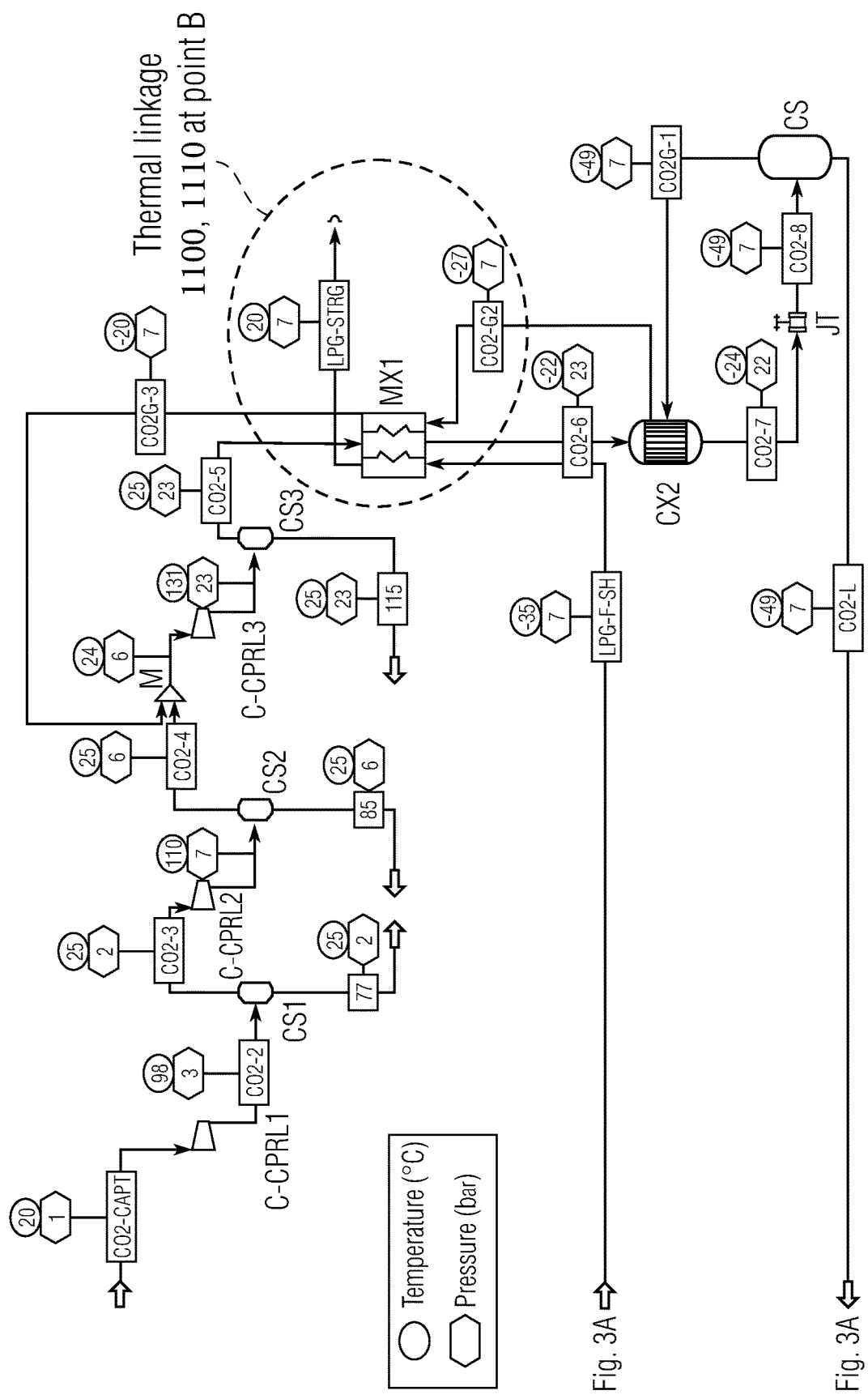

FIGS. 3A-3B provide a high-level diagram of an embodiment of the $CO_2$ and liquid hydrocarbon transport scheme, including exemplary thermal linkages (including heat exchangers B2 and CX2) in the transport scheme in accordance with one or more embodiments. In particular, FIGS. 3A-3B displays a high-level scheme showcasing some of the integration options and levels of temperatures and pressures expected in the different flows.

In at least one embodiment, the same logic for co-transport of $CO_2$ with hydrocarbons as shown in FIGS. 3A-3B can be followed and can include the heat integration at both ends of the transport scheme. In one or more embodiments, the LPG as shown in FIGS. 1 and 3A-3B can be replaced by liquefied natural gas (LNG). In such an embodiment, $CO_2$ and LNG can be transported in the same vessel and can have heat integration at both terminals (i.e., Points A and B). A primary difference in such an embodiment is that LNG is transported at a temperature lower than $CO_2$, so LNG coldness is used at the destination terminal (i.e., Point B) to liquefy the $CO_2$ and maintain the temperature of the $CO_2$ storage facility. On the LNG loading side (Point A), the $CO_2$ coldness is used to assist the liquefaction of the LNG. The $CO_2$ feeding the supercritical $CO_2$ cycle would remain the same in all cases.

In at least one embodiment, LPG can be replaced by other hydrocarbon-based substances (preferably between C1 to C7 hydrocarbons individually or as mixture) such as ethylene, dimethyl ether (DME), or any other hydrogen carrier with the optionality to transport back the $CO_2$. In addition, in at least one embodiment LPG can be replaced by liquefied ammonia.

Accordingly, as described in the above description, the present systems and methods allow for heat transfer and energy recovery between the unloading and/or neighboring facility and the coldness of the transported goods (e.g., $CO_2$ and LPG). In addition, the present systems and methods allows for an effective re-liquefaction of the $CO_2$ boil-off and $CO_2$ purification while removing the non-condensable gases (e.g., nitrogen). Further, the present systems and methods allow for the reduction of the $CO_2$ transport costs by allowing the usage of the same vessel that is carrying hydrocarbons such as LPG or ammonia to transport the $CO_2$ on its way back to load additional hydrocarbons instead of returning empty, which saves considerable $CO_2$ transport costs. The present systems and methods also teach coldness integration with the unloading terminal and/or nearby facilities which reduces the overall energy intensity at the unloading terminal.

The present systems and methods also overcomes shortcomings in the field. In particular, there is a lack of efficient or proven ways to transport liquid hydrogen (i.e., liquid hydrocarbons) over long distances and other hydrogen carrier options such as ammonia or methylcyclohexane are expensive. Further, current technologies do not link the energy recovery of the coldness of LPG and $CO_2$ at both terminal (e.g., in the present scheme, Point A and Point B). Finally, the present systems and methods allows for heat/cold integration in different parts of the transport chain and purifies the $CO_2$ feed while it is being transported in the vessel, thereby saving overall energy consumption and reducing the $CO_2$ transport costs. As such, the present systems can be a significant part of the overall Carbon Capture and Sequestration (CCS) chain.

It should be understood that although much of the foregoing description has been directed to systems and methods for efficiently transporting liquid hydrocarbons and $CO_2$, the system and methods disclosed herein can be similarly deployed and/or implemented in scenarios, situations, and settings far beyond the referenced scenarios. It should be further understood that any such implementation and/or deployment is within the scope of the system and methods described herein.

It is to be further understood that like numerals in the figures represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The subject matter described above is provided by way of illustration only and should not be construed as limiting. Various modifications and changes can be made to the subject matter described herein without following the example embodiments and applications illustrated and described, and without departing from the true spirit and scope of the present invention.

What is claimed is:

1. A loading and unloading station for simultaneous unloading of a first fluid from at least one storage tank in a vessel and loading of a second fluid into a storage tank of the same vessel, wherein the first fluid comprises liquefied petroleum gas (LPG) and the second fluid comprises $CO_2$, the loading and unloading station comprising:
   a first connector for fluid connection to the at least one storage tank for unloading the first fluid;
   a source of the second fluid;
   a second connector for fluidly connecting the source of the second fluid with the at least one storage tank of the vessel for loading the second fluid into the at least one storage tank;
   a first thermal linkage between the first fluid being unloaded and the second fluid being loaded that facilitates heat transfer between the first fluid and the second fluid at the loading and unloading station; and
   an expansion device configured to receive at least a portion of the LPG from the at least one storage tank in the vessel, wherein the expansion device is configured to reduce a pressure of the LPG prior to its delivery to an LPG unloading unit.

2. The loading and unloading station of claim 1, wherein the first thermal linkage comprises a heat exchanger that transfers coldness of the LPG to the $CO_2$ resulting in cooling of the $CO_2$.

3. The loading and unloading station of claim 1, wherein the loading and unloading station further comprises:
   a $CO_2$ capture unit configured to capture $CO_2$ produced from a carbon containing source; and
   a $CO_2$ liquefaction unit fluidly connected to $CO_2$ capture unit and the source of the second fluid, wherein the $CO_2$ liquefaction unit is configured to receive the captured $CO_2$ from the $CO_2$ capture unit, and to liquefy the captured $CO_2$ to desired storage conditions and transport conditions.

4. The loading and unloading station of claim 3, wherein the $CO_2$ capture unit and the $CO_2$ liquefaction unit are a single unit.

5. The loading and unloading station of claim 3, wherein the loading and unloading station further comprises:
   a hydrogen production unit fluidly connected to the at least one storage tank for unloading the LPG, wherein the hydrogen production unit is configured to receive the LPG from the at least one storage tank for unloading the LPG and utilize the LPG as a feed stream for producing hydrogen.

6. The loading and unloading station of claim 5, wherein the $CO_2$ capture unit is operatively connected to the hydrogen production unit, and further configured to capture $CO_2$ from synthetic gas produced in the hydrogen production unit.

7. A loading and unloading station for sequentially unloading $CO_2$ from at least one storage tank in a vessel and for loading LPG into a storage tank of the same vessel comprising:
   an LPG production unit;
   an LPG storage unit, the storage unit being in fluid communication with the LPG production unit;
   a first connector for fluid connection to the LPG storage unit for loading the LPG into the storage tank of the vessel;
   a second connector for unloading $CO_2$ into a $CO_2$ storage unit;
   at least one of: (A) a first thermal linkage that is configured to: transfer coldness from the $CO_2$ to facilitate liquefaction of the LPG through the first thermal linkage that is associated with the LPG production unit and the CO2 storage unit and (B) a second thermal linkage that is configured to maintain temperature of the LPG storage unit through the second thermal linkage;

a $CO_2$ compression unit that compresses the $CO_2$ above a predetermined pressure; and a supercritical $CO_2$ unit that receives $CO_2$ from the compression unit, whereby a high pressure, cold $CO_2$ stream is put in thermal linkage with at least one of the LPG production unit and the LPG storage unit.

8. The loading and unloading station of claim 7, wherein the supercritical CO2 cycle comprises:

an internal heat exchanger, an external heat exchanger, and a CO2 turbine, wherein the internal heat exchanger is configured to heat the high pressure, cold CO2 stream and transfer the high pressure, cold CO2 stream to the external heat exchanger, wherein the external heat exchanger is configured to further heat the high pressure, cold CO2 stream to create a high pressure, high temperature CO2 stream, and configured to transfer the high pressure, high temperature CO2 stream to the CO2 turbine, and wherein the CO2 turbine is configured to expand the high pressure, high temperature CO2 stream to generate power.

9. The loading and unloading station of claim 8, further comprising:

a heat source operatively connected to the external heat exchanger via a heat linkage, wherein the heat source provides the energy for heating the high pressure, cold CO2 stream in the external heat exchanger.

10. The loading and unloading station of claim 9, wherein the high pressure, high temperature $CO_2$ stream exiting the external heat exchanger has a temperature in a range of 100° C. to 800° C.

11. The loading and unloading station of claim 7, wherein the $CO_2$ compression unit compresses the $CO_2$ to a pressure in the range of 200 to 500 bar.

12. A system for simultaneous loading and unloading of $CO_2$ and a liquid hydrocarbon, the system comprising:

a vessel comprising at least one storage tank configured to transfer the CO2 or the liquid hydrocarbon, and configured to load and unload at least one of the liquid hydrocarbon and CO2;

a first station at which the liquid hydrocarbon is produced, wherein the first station comprises:

a liquid hydrocarbon loading unit, a first conduit configured to selectively connect the liquid hydrocarbon loading unit, a CO2 unloading unit, a second conduit configured to selectively connect the CO2 unloading unit to the vessel, and at least one of: (a) a first thermal linkage configured to transfer coldness from the second conduit to the first conduit to facilitate liquefaction of the liquid hydrocarbon and (b) second thermal linkage between the first conduit and second conduit configured to cause condensation of the liquid hydrocarbon in the first conduit, a CO2 storage unit fluidly connected to the CO2 unloading unit and configured to receive CO2 from the CO2 unloading unit, and a CO2 compression unit fluidly connected to the CO2 storage unit and configured to receive CO2 from the CO2 unloading unit, wherein the CO2 compression unit is configured to compress CO2 above a predetermined pressure;

a second station at which the CO2 is collected, wherein the second station comprises:

a CO2 loading unit, a third conduit configured to selectively connect the CO2 loading unit to the vessel, a liquid hydrocarbon unloading unit, and a fourth conduit configured to selectively connect the liquid hydrocarbon unloading unit to the vessel, wherein, at the first station, the vessel is configured to simultaneously unload CO2 via the CO2 unloading unit and load the liquid hydrocarbon into the at least one storage tank, and at the second station, the vessel is configured to simultaneously unload the liquid hydrocarbon via the liquid hydrocarbon unloading unit and load the CO2 into the at least one storage tank.

13. The system of claim 12, wherein the second station further comprises:

a $CO_2$ capture unit configured to capture $CO_2$ produced from a carbon containing source; and a $CO_2$ liquefaction unit fluidly connected to CO2 loading unit, wherein the $CO_2$ liquefaction unit is configured to receive the captured $CO_2$ from the $CO_2$ capture unit, and to liquefy the captured $CO_2$ to desired storage conditions and transport conditions; and a third thermal linkage between the $CO_2$ liquefaction unit and the fourth conduit, wherein the third thermal linkage is configured to help the liquefaction of CO2.

14. The system of claim 12, further comprising:

a CO2 supercritical cycle fluidly connected to the CO2 compression unit, wherein the CO2 supercritical cycle is configured to receive CO2 from the CO2 compression unit and generate power.

15. The system of claim 14, wherein the vessel further comprises:

a boil-off compression unit fluidly connected to the at least one storage tank and configured to receive a boil-off stream from the at least one storage tank comprising CO2 and non-condensable gases, and compress the boil-off stream;

a non-condensable separation unit fluidly connected to the boil-off compression unit and configured to receive the compressed boil-off stream, and separate the non-condensable gases from the CO2; and a boil-off liquefaction unit fluidly connected to the non-condensable separation unit and configured to receive the separated CO2, liquefy the CO2, and transfer the liquefied CO2 back to the at least one storage tank.

* * * * *